United States Patent [19]

Schiffmann et al.

[11] 4,157,403
[45] Jun. 5, 1979

[54] MICROWAVE BAKING OF BROWN AND SERVE PRODUCTS

[75] Inventors: Robert F. Schiffmann, Manhattan; Alfred H. Mirman, Nanuet; Richard J. Grillo, Hawthorne, all of N.Y.; Sally A. Wouda, Charlottesville, Va.

[73] Assignee: International Telephone & Telegraph Corporation, Nutley, N.J.

[21] Appl. No.: 704,270

[22] Filed: Jul. 12, 1976

[51] Int. Cl.² ................................................ A21D 6/00
[52] U.S. Cl. .................................... 426/234; 426/27; 426/241; 426/243; 426/396
[58] Field of Search ............... 426/27, 128, 241, 243, 426/396, 549, 413, 415, 505, 234; 219/10.55 A, 10.55 E, 10.55 M

[56] References Cited

U.S. PATENT DOCUMENTS

| | | | |
|---|---|---|---|
| 2,649,379 | 8/1953 | Woods | 426/396 X |
| 3,556,817 | 1/1971 | Jeppson | 426/241 |
| 3,630,755 | 12/1971 | Schiffmann et al. | 219/10.55 M |
| 3,881,403 | 5/1975 | Ingram et al. | 219/10.55 A |

OTHER PUBLICATIONS

Decareau et al., *J. of Microwave Power*, 3,(3), (1968), pp. 152-157.
Olsen, "Microwaves Inhibit Bread Mold," *Food Engineering*, Jul. 1965, pp. 51-53.
Cathcart et al., "The Treatment of Packaged Bread with High Frequency Heat," presented before the 6th Annual Food Conference, Buffalo, N.Y., Mar. 19, 1946.
Pyler, *Baking Science & Technology*, vol. II, Siebel Publishing Co., Chicago, Ill., (1973), pp. 801-802.

Primary Examiner—Raymond N. Jones
Assistant Examiner—Esther M. Kepplinger
Attorney, Agent, or Firm—John T. O'Halloran; Robert A. Walsh

[57] ABSTRACT

Brown and serve products are produced by a microwave process in substantially less time than the current conventional production time. These products are baked directly in the sales carton which eliminates most handling and transfer. In addition, the shelf life of brown and serve rolls is increased by microwave baking in the sales carton and immediately overwrapping while hot with a shrink film overwrap. The process of microwave proofing of brown and serve rolls also reduces the overall processing time.

6 Claims, 1 Drawing Figure

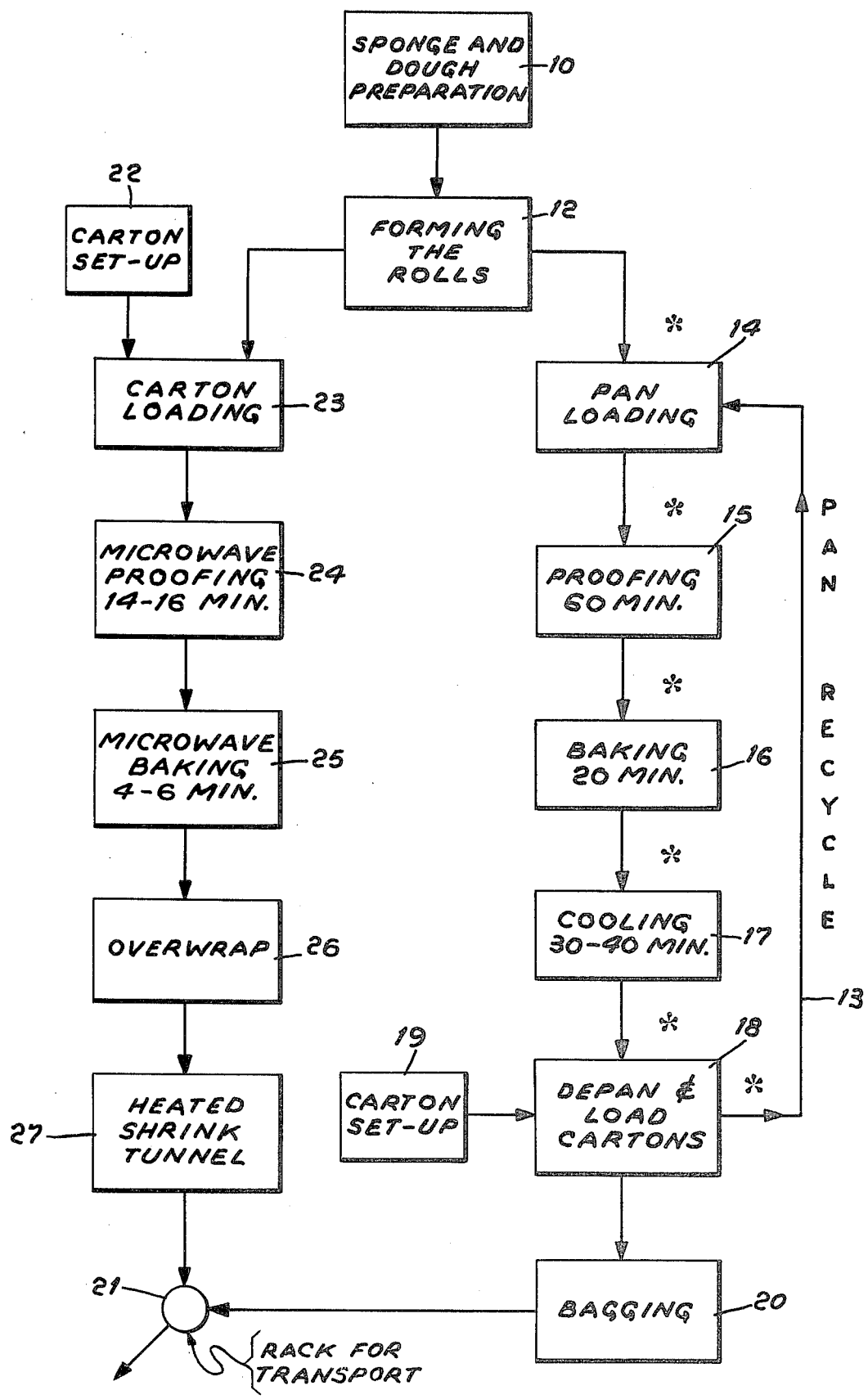

MICROWAVE BAKING OF BROWN AND SERVE PRODUCTS

BACKGROUND OF THE DISCLOSURE

In general, this invention relates to microwave baking of brown and serve products, and more particularly to the application of microwave energy for the baking of brown and serve rolls.

Since microwave energy is known to have the ability to heat many food materials, most usually without the high heat on the surface needed for browning, the brown and serve product and the microwave process would seem most perfectly suited to one another. Under current production methods, brown and serve rolls are baked in a low temperature oven for 20 minutes with temperatures of the various zones ranging from 200° to 290° F. By comparison, fully baked rolls of the same size are baked for only 11 minutes in temperatures ranging from 380° to 410° F. The much longer bake times for brown and serve rolls coupled with the time lags required to cool down and later reheat the ovens make the current process a very inefficient and burdensome operation.

In a typical year, a large commercial bakery will produce approximately 18 million pounds of brown and serve rolls. Considering all of the factors, along with the possibility of extending shelf life through retardation of mold growth with microwaves, a process of microwave baking of brown and serve rolls is important to both industry and consumer.

BRIEF DESCRIPTION OF THE DRAWING

The invention will be best understood if reference is made to the sole FIGURE which shows a comparison between the brown and serve roll products using the microwave process of this invention and the conventional process.

DESCRIPTION OF THE PREFERRED EMBODIMENT

The following typical formula and procedure were used for the brown and serve rolls.

| FORMULA | Ingredients | Parts by Weight Based on 100 Parts Flour |
|---|---|---|
| Sponge | | |
| | Wheat flour, patent, enriched | 70.00 |
| | Yeast | 2.75 |
| | Yeast food | 0.50 |
| | Water | 40.00 |
| Dough | | |
| | Wheat flour, patent, enriched | 30.00 |
| | Salt | 1.75 |
| | Corn sugar (dry) | 12.00 |
| | Shortening | 7.50 |
| | Mono and diglycerides, hydrated | 1.50 |
| | Calcium propionate | 0.32 |
| | Water | 15.00 |

PROCEDURE

The sponge ingredients are mixed approximately 4 minutes in a standard mixer to obtain a sponge with a temperature of about 76° F. which is allowed to ferment for about 4 hours.

Then the sponge is combined with the dough ingredients and mixed for approximately 10 minutes to obtain a dough with a temperature of about 80° F. The dough is allowed to relax for an additional 5 to 10 minutes and divided into pieces weighing 14 ounces per dozen. The pieces are shaped into round balls, allowed to rest for about 2 minutes, and placed in pans or the cartons.

EXAMPLE

Referring now to the drawing, the sponge and dough were prepared according to the foregoing procedure, 10, and the dough was divided and formed into rolls, 12, for both the microwave and conventional processes.

The right-hand side of the flow diagram represents the conventional procedure. The individual rolls are loaded in a pan, 14, and allowed to proof, 15, for about 60 minutes with a baking time, 16, of 20 minutes and cooled, 17, for 30–40 minutes. The rolls are then depanned and loaded in cartons, 18, which are fed from a carton feed machine, 19, bagged, 20, and placed on racks for transportation, 21. The asterisk (*) in the cycle indicates that the metal pans are loaded and unloaded and in the conventional process this occurs six times in each cycle before the pan is returned for recycling as indicated by line 13.

The novel microwave process of this invention is indicated on the left side of the flow diagram. A carton set-up, 22, is initiated and the rolls, 12, are loaded into a typical 3×4 package, 23. The loaded cartons are microwave proofed, 24, for a period of 14 to 16 minutes, preferably for about 15 minutes. The microwave proofed rolls are then microwave baked, 25, in the microwave oven for 4 to 6 minutes, preferably for about 5 minutes. The microwave baked rolls are then immediately overwrapped, 26, and passed through a heated shrink tunnel, 27, and then placed on a rack, 21, for transport.

The advantages of the foregoing process are readily apparent in that there is a reduction in processing time, reduced labor requirements, increased productivity, reduced floor space, reduced overseeing of in-processing inventory, reduced product damage due to less handling as required with hand loading and unloading, and instant start-up and shut-down.

In addition, the energy requirement has been reduced from about 650 BTU's per pound for the conventional process to about 200 BTU's per pound for the microwave process. Manpower has been approximately reduced in half due to elimination of numerous hand loading and unloading operations, which reduce the overall cost of the product and eliminates pan cost from the operation.

The most important advantage, however, is that the product can be produced having a longer shelf life at a quality which is better or equivalent to the conventional quality, but at lower cost to the consumer.

DISCUSSION OF MICROWAVE BAKING RESULTS

From the foregoing example, the advantages achieved in a process of preparing brown and serve rolls with microwave energy, with very fast baking times, are described below. Only about 20 minutes for the microwave energy processing is required, as opposed to about 80 minutes for the conventional process. Further, it is not necessary to heat the air surrounding the product to high temperatures, because the microwave energy couples directly into the rolls to cause their baking very efficiently. Another major advantage is that the rolls are baked directly in the paperboard container in which they are sold, as opposed to the current methods wherein, because of the high ambient temperature required, the rolls must be baked in metal bake pans and then later transferred to the package in which they are to be sold.

Another factor which played a large part in achieving success in this set of experiments was the selection of the proper microwave frequency. The initial work was done at the most commonly used frequency of 2450 MHz, and while good product was prepared, a problem in product uniformity was encountered. This manifested itself as underbaking of the two center rolls in the package of 3×4 rolls. A switch to the lower microwave frequency of 915 MHz overcame the uniformity problem because of its longer wavelength. It was also discovered that a mix of 915 MHz and 2450 MHz microwave power in the ratio of approximately 50:50 also yielded good uniform products. It should be noted, however, that dropping the 915 MHz level in this technique much below this ratio will again produce uniformity problems even though the total amount of microwave power is kept the same.

It was determined that the amount of microwave power required could be kept quite low, averaging approximately 650 watts per fourteen ounce package of twelve rolls, for the preferred five minute baking time. Power levels between 600 to 700 watts provide uniformity of baking with control of bakeout. This converts to a range of power flux densities of 45.5 to 79.6 watt hours per pound and 61.6 watt hours per pound for the preferred example. While higher or lower power inputs and shorter or longer bake times are possible, such may raise other problems, particularly those of uniformity of baking, which are best avoided. Although it may be desirable to divide the microwave power evenly between the 915 MHz and 2450 MHz frequencies, it should be noted that to use as much or all of the power at the 915 MHz frequency may be arranged as a means of keeping equipment costs low and for easier microwave leakage shielding.

A number of tests were run on the influence of ambient conditions upon the product. Normally the air temperature in the microwave oven did not exceed 130° F. In general, high ambient temperatures, in the range of 110° to 130° F., were superior to temperatures below this. Humidity was, for the most part, kept fairly high, at about 70% RH.

In summary, successful baking of brown and serve rolls was achieved with a paperboard container in which they are sold, using microwave energy as the sole source of heat at a power flux density of approximately 61.6 watt hours per pound for about a five minute baking time.

DISCUSSIONS OF EXTENSION OF SHELF LIFE RESULTS

It has been known for quite some time that microwaves can be used to destroy molds and bacteria. While this is true, it is difficult to carry this over into normal practice, since the destruction of microorganisms during the baking cycle does not protect the finished product from reinoculation during cooling, prior to final packaging. This problem was approached by first trying to bake within the overwrapped, sealed or partially sealed package. This was found to be impractical since the condensate evolved as a result of bakeout, pooled in the package leaving the surface of the rolls wet, the packaging material soaking and puddles of condensate everywhere. Real success was achieved by first baking the rolls in their paperboard container in the microwave system, and then quickly overwrapping with a shrink film and passing the product through a shrink tunnel. In this case, the microwave baking destroyed all the organisms present, while the combination of overwrapping while hot and the heat of the shrink tunnel served to prevent reinfection by airborne mold spores. In order to handle the baking and the shrink film, a double sidewall paperboard carton with the "Let-Go" coating, manufactured by Lowe Paper, was used, and "polybutylene shrink film" manufactured by Mobil Chemicals was used for the overwrap.

After the initial successful trials of the system described above, a large scale microwave baking and storage test was completed.

The test compared the storage life of conventionally prepared brown and serve rolls (Series C) to microwave baked rolls packaged either hot with the polybutylene shrink film overwrap (Series S), or cool with the polyethylene bag overwrap (Series P). Further, half of the samples in each group were deliberately inoculated with mold spores. The control and the polyethylene bag overwrapped microwave samples were inoculated after 30 minutes of cooling; the microwave baked/shrink film samples were innoculated while hot, just prior to overwrapping. Still further, half of all the samples were made with the conventional propionate level while the other half used only 25% of that level. The rolls were prepared with the typical formula and baked 20 minutes for the controls and the preferred five minutes for the microwave samples. The results in terms of mold growth are shown in Table 1.

TABLE 1

| MOLD DEVELOPMENT AFTER ONE MONTH: BROWN AND SERVE ROLLS | | | | | | |
|---|---|---|---|---|---|---|
| Code No. | Baking | Temp. When Wrapped | Type of Overwrap | Propionate Level | Innoculated w/ Mold Spores | # Samples Showing Mold Growth | % of Code Showing Mold Growth |
| C1a | Control | Cool | Polyethylene bag Twist tie | High | Yes | 11 | 84.6% |
| C1b | " | " | " | " | No | 2 | 20.0% |
| C2a | " | " | " | Low | Yes | 11 | 84.6% |
| C2b | " | " | " | " | No | 1 | 9.1% |
| P1a | Microwave | Cool | " | High | Yes | 14 | 93.3% |
| P1b | " | " | " | " | No | 2 | 12.5% |
| P2a | " | " | " | Low | yes | 12 | 80.0% |
| P2b | " | " | " | " | No | 8 | 53.3% |
| S1a | " | Hot | Polyethylene Shrink Film | High | Yes | 1 | 6.7% |
| S1b | " | " | " | " | No | 2 | 13.3% |
| S2a | " | " | " | Low | yes | 5 | 33.3% |

TABLE 1-continued
MOLD DEVELOPMENT AFTER ONE MONTH: BROWN AND SERVE ROLLS

| Code No. | Baking | Temp. When Wrapped | Type of Overwrap | Propionate Level | Innoculated w/ Mold Spores | # Samples Showing Mold Growth | % of Code Showing Mold Growth |
|---|---|---|---|---|---|---|---|
| S2b | " | " | " | " | No | 10 | 66.7% |

Totals within packaging types:
C code series - Control - 25 moldy samples: 53.2% moldy
P code series - Microwave/Polyethylene - 36 moldy samples: 59.0% moldy
S code series - Microwave/Shrink Film - 18 moldy samples: 30.0% moldy.

While these results show a significant reduction in the mold growth by the combination of microwave baking and shrink film overwrapping, particularly where a conventional level of propionate has been employed, it is important to note the following: That the first signs of mold growth were seen on the controls after 12 days and this included large numbers of both high and low level propionate containing samples. However, it was not until after 18 days of storage of the microwave/shrink film samples that the first mold growth was seen on a low propionate containing sample, and 27 days on the first high propionate level sample.

In summary, the shelf life of brown and serve rolls has been extended at least one week using the technique which employs overwrapping the product, while hot, with a shrink film and then passing it through the heated shrink tunnel. Further, the standard level of propionate can be maintained in the product.

DISCUSSION OF MICROWAVE PROOFING RESULTS

In connection with the rapid baking process possible with microwaves, a significant advantage is obtained if a similarly rapid technique is used for proofing the brown and serve rolls. This enables a continuous, automated system from the molder divider through the final packaging steps. Microwave proofing in the tests proved successful using 915 MHz with low levels of power of about 85 to 150 watts per 14 oz. carton for 7–12 minutes, and preferably, about 100 watts per 14 oz. carton for a time of about 10 minutes. These figures convert to a range of useful power flux densities of 11 to 34 watt hours per pound and for the preferred example, 19.0 watt hours per pound.

CONCLUSIONS

The process described above provides a commercial system of considerable advantage beyond that of the present systems. The microwave system is far more efficient in time and manpower. The microwave equipment to commercially implement the novel process would probably consist of either a single two-zoned straight line conveyor or two straight line conveyors in tandem to handle the differing power requirements and ambient conditions involved in the proofing and baking.

While many bakeries differ in detail, the basic operations are the same, and many of the present systems depend on a great deal of manpower, much of it being used to transfer metal pans from one operation to another. The high degree of automation possible with the microwave system eliminates a great deal of this labor, particularly since the product is proofed and baked within its sales carton. Some costs are not easily available or calculable; for example, pan costs, which involve not only the costs of the pan themselves and the spare pans, but also labor for washing, handling, reglazing, etc. Similarly, some other facts are not immediately seen; for example, that the instantaneous heating of microwave energy eliminates the long time heating up and cooling down associated with conventional ovens.

Another advantage of the instantaneous heat and the short processing time is that production errors can be quickly rectified with comparatively very small in-process inventory.

Also not be overlooked are the technical and commecial advantages which will be for the ultimate benefit of the consumer.

While we have described above the principles of our invention in connection with specific process steps and equipment, it is to be clearly understood that this description is made only by way of example and not as a limitation to the scope of our invention as set forth in the objects thereof and in the accompanying claims.

We claim:

1. A method of processing brown and serve rolls comprising the steps of:
   preparing a dough;
   forming the individual rolls;
   placing the rolls in sales cartons;
   proofing said rolls for about 7 to 12 minutes utilizing microwave energy having a frequency of 915 MHz and a flux density of about 11 to 34 watt hours per pound; and baking said rolls for about 4 to 6 minutes utilizing microwave energy having a frequency of 915 MHz at an effective flux density.

2. The method of claim 1, further including the step of:
   wrapping the baked rolls, while hot, with a shrink film and then passing the wrapped cartoned rolls through a heated shrink tunnel.

3. A method of increasing shelf life of brown and serve rolls comprising the steps of:
   cartoning the dough formed rolls;
   proofing the rolls utilizing microwave energy having a frequency of 915 MHz and a flux density of about 11 to 34 watt hours per pound for an effective time;
   baking the rolls with microwave energy having a frequency of 915 MHz; wrapping the baked rolls while hot with a shrink film; and passing said rolls through a shrink tunnel.

4. The method of claim 3, wherein the proofing time is about 7 to 12 minutes.

5. The method of claim 4, wherein the microwave baking energy is applied for about 4 to 6 minutes at flux densities between about 47.6 to 76.2 watt hours per pound.

6. A method of decreasing the time required for processing brown and serve rolls and improving shelf life of said rolls, comprising:
   preparing a dough;
   forming individual rolls from said dough;
   placing the rolls in the retail carton;
   proofing and baking said rolls in the carton with microwave energy having a mixture of frequencies of 915 MHz and 2450 MHz at an effective flux density for an effective time; and
   promptly overwrapping the cartoned rolls while still hot with a heat shrinkable film in a heated tunnel.

* * * * *